Aug. 30, 1949.  W. C. McCOY  2,480,811
TIRE AND METHOD OF MAKING
Filed April 15, 1948  5 Sheets-Sheet 1
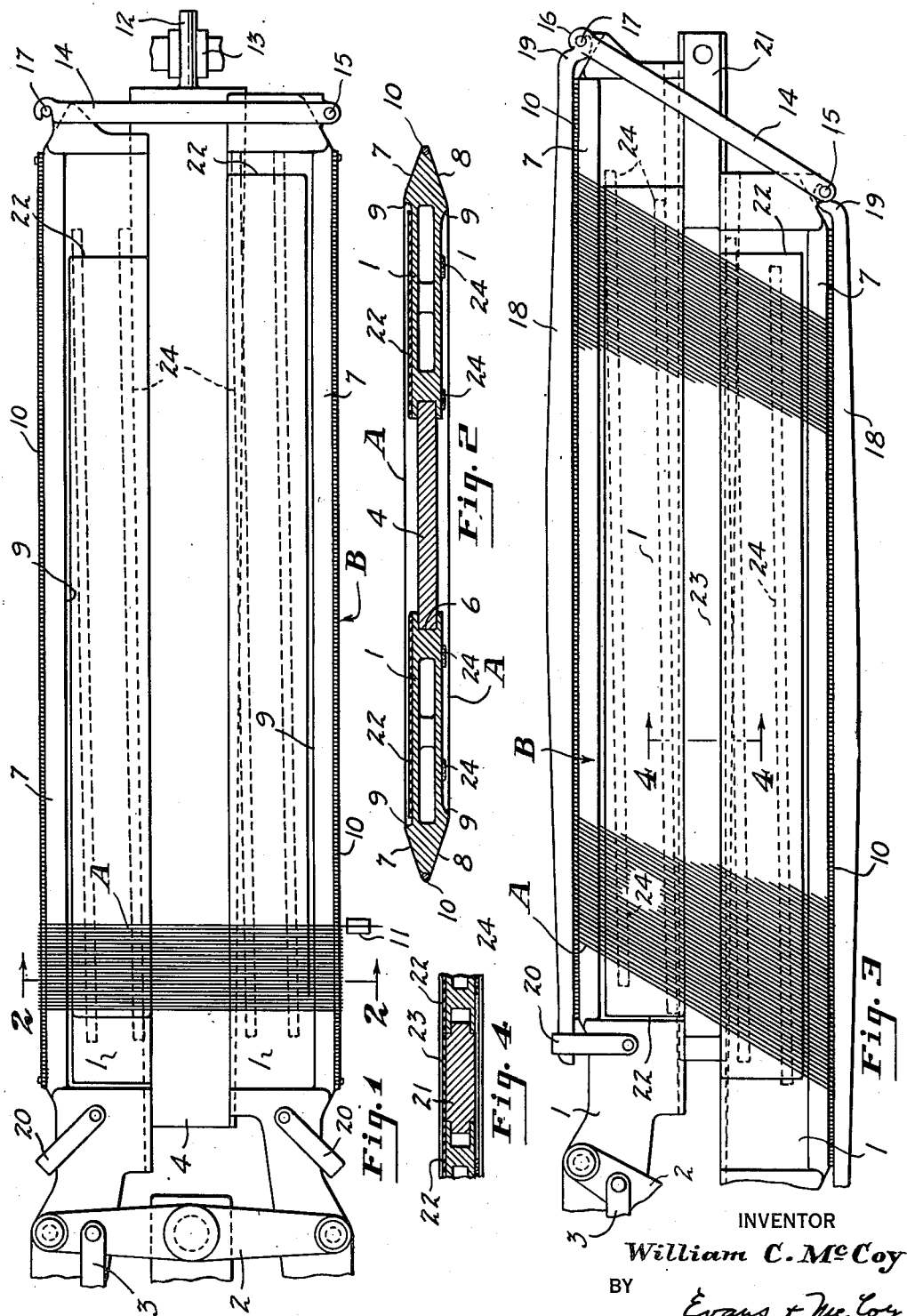
INVENTOR
William C. McCoy
BY
Evans + McCoy
ATTORNEYS Aug. 30, 1949.                    W. C. McCOY                    2,480,811
                           TIRE AND METHOD OF MAKING
Filed April 15, 1948                                         5 Sheets-Sheet 2

INVENTOR
William C. McCoy
BY Evans + McCoy
ATTORNEYS

Aug. 30, 1949.   W. C. McCOY   2,480,811
TIRE AND METHOD OF MAKING
Filed April 15, 1948   5 Sheets-Sheet 3

INVENTOR
William C. McCoy
BY Evans + McCoy
ATTORNEYS

Aug. 30, 1949.  W. C. McCOY  2,480,811
TIRE AND METHOD OF MAKING
Filed April 15, 1948  5 Sheets-Sheet 4
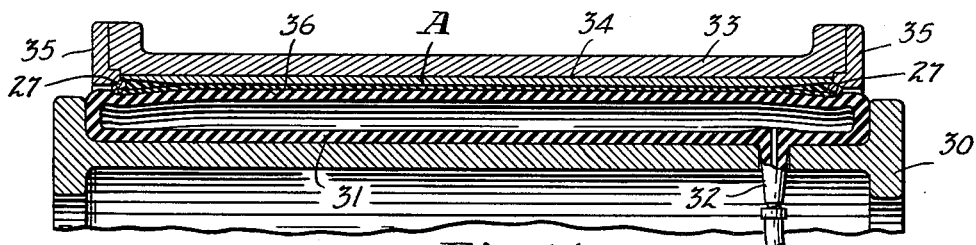
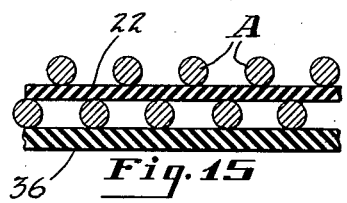
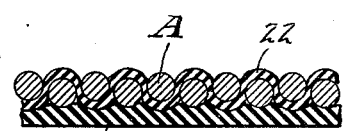
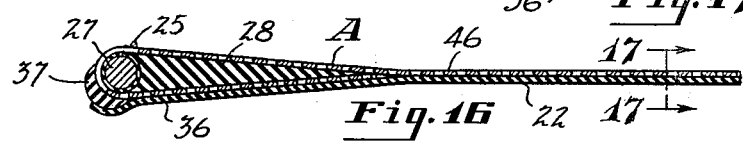
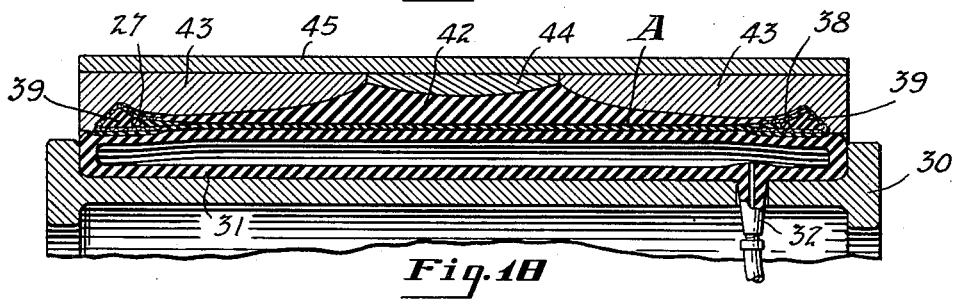
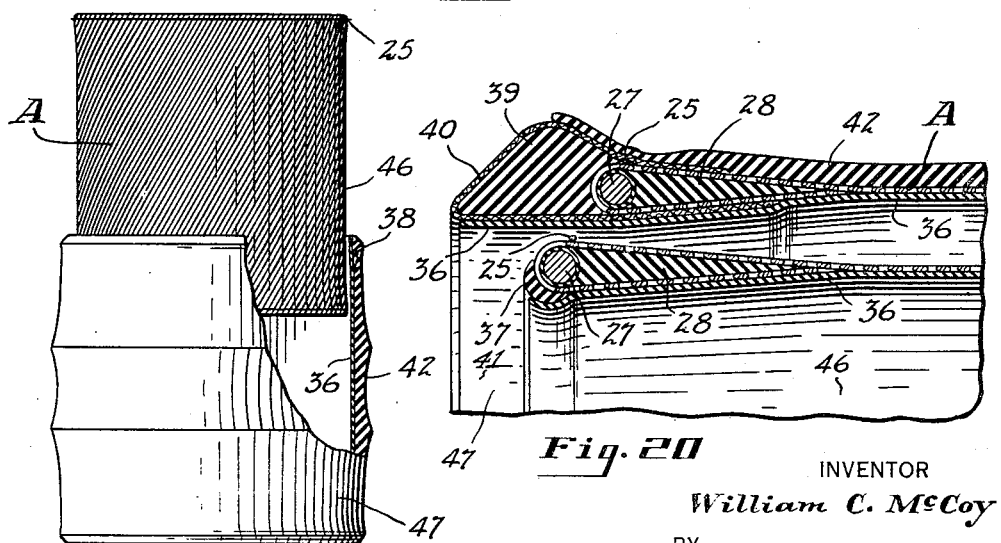
INVENTOR
William C. McCoy
BY Evans + McCoy
ATTORNEYS Aug. 30, 1949. W. C. McCOY 2,480,811
TIRE AND METHOD OF MAKING
Filed April 15, 1948 5 Sheets-Sheet 5

INVENTOR
William C. McCoy
BY Evans + McCoy
ATTORNEYS

Patented Aug. 30, 1949

2,480,811

UNITED STATES PATENT OFFICE 2,480,811

TIRE AND METHOD OF MAKING

William C. McCoy, Cleveland, Ohio, assignor to The General Tire and Rubber Company, Akron, Ohio, a corporation of Ohio Application April 15, 1948, Serial No. 21,179

5 Claims. (Cl. 154—14)

This invention relates to an improved tire casing and to a machine for and method of making pneumatic tire casings or similar casings for fluid actuated brakes, clutches or couplings and the like, which are reinforced with cabled, high tensile steel wire or similar high tensile material.

The invention has for an object to provide a method of and machine for making a tire casing of the character described in which the reinforcement consists of one or more continuous steel wires or cables which are looped back and forth around the beads and extend throughout the circumference of the tire.

The invention has for a further object to provide a method by which the successive convolutions of the coiled reinforcing wire are diagonally disposed and uniformly spaced throughout the circumference of the tire.

With the above and other objects in view, the invention may be said to comprise the method and apparatus as illustrated in the accompanying drawings, hereinafter described and particularly set forth in the appended claims, together with such variations and modifications thereof as will be apparent to one skilled in the art to which the invention pertains.

Reference should be had to the accompanying drawings forming part of this specification, in which:

Figure 1 is a top plan view of the core upon which the reinforcing wire is coiled;

Fig. 2 is a transverse section taken on the line indicated at 2—2 in Fig. 1;

Fig. 3 is a plan view of the core after it has been collapsed to dispose of the wire coils diagonally;

Fig. 4 is a fragmentary section taken on the line indicated at 4—4 in Fig. 3;

Fig. 14 is a sectional view showing the band compressing drum which is used to flatten the band;

Fig. 15 is a fragmentary sectional view showing a portion of the band prior to the compressing operation;

Fig. 16 is a fragmentary sectional view showing the bead portion of the band;

Fig. 17 is a fragmentary section corresponding to that shown in Fig. 15 that shows the band after the compressing operation;

Fig. 18 is a sectional view showing the method of compressing the tread stock on the wire reinforced band;

Fig. 19 is an elevational view showing an inner band of smaller diameter being telescoped into an outer band to which tread stock has been applied;

Fig. 20 is a fragmentary section through the bead portions of the telescoped bands.

Figure 5:
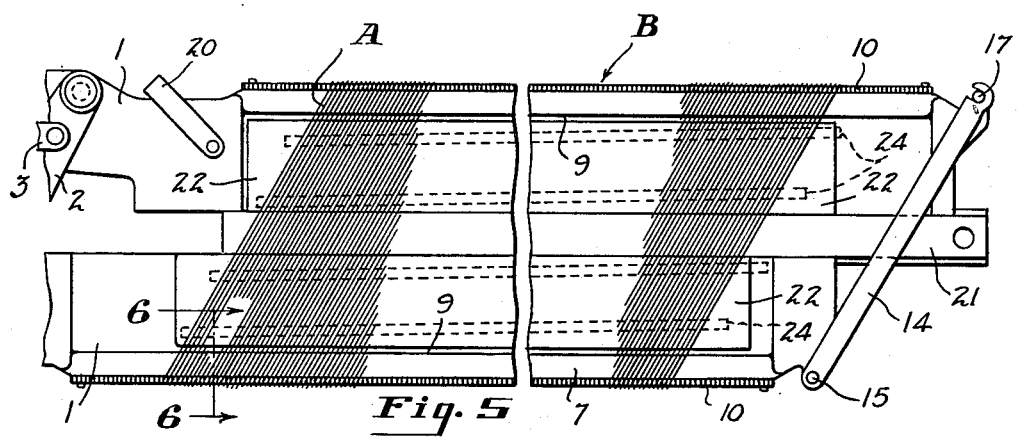
Fig. 5 is a top plan view of the collapsed core with the tire clamping bars removed.
Figure 6:
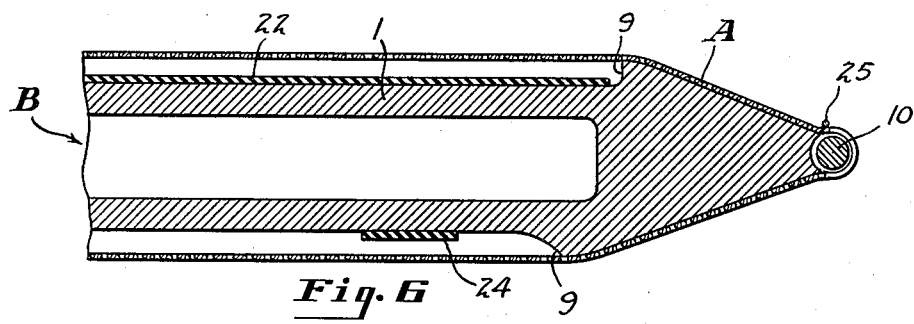
Fig. 6 is a fragmentary section on an enlarged scale taken on the line indicated at 6—6 in Fig. 5.
Figure 7:
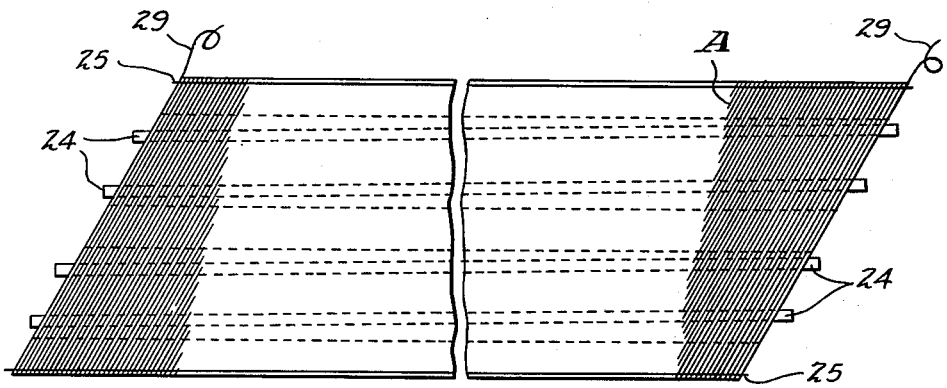
Fig. 7 is a plan view of the elongated flat tubular body of coiled wire after it is removed from the core.
Figure 8:
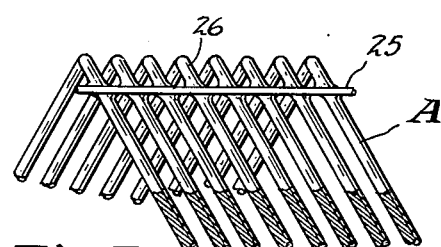
Fig. 8 is a fragmentary top plan view of an edge portion of the tubular body on an enlarged scale.
Figure 9:
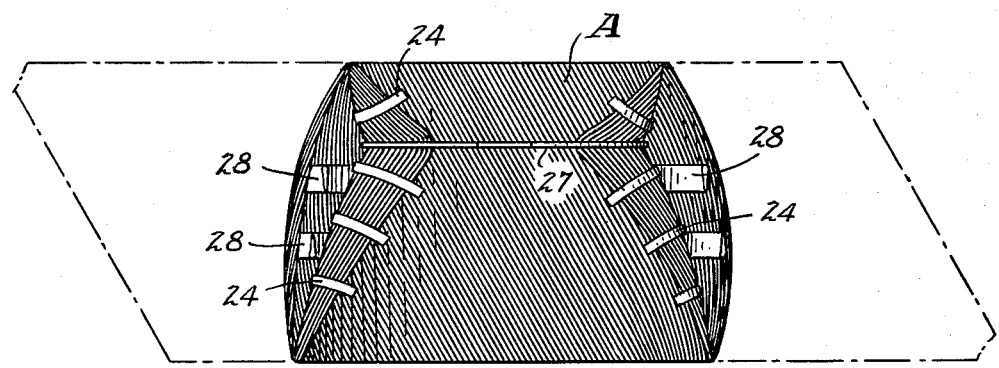
Fig. 9 is a perspective view showing a bead ring in place within one edge portion of the tubular body.
Figure 10:
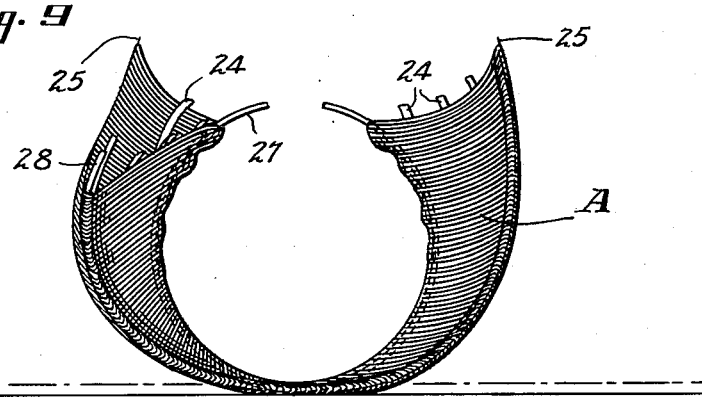
Fig. 10 is a side elevation of the tubular body with one of the bead rings inserted.

In building tire casings by the method of the present invention, carcass bands are formed by helically winding stranded steel cable upon a flat core which is then manipulated to dispose the strands diagonally, after which the coils are held in proper spaced relation and at the desired angularity by means of sheet rubber, and rubber strips adhered to the wire, and also by longitudinal wires soldered to the bead-receiving edge portions of the coil. The loop portions of the cable for receiving the beads are rendered non-resilient by filling the strands of the cable with solder. The bead rings are then inserted into the flat tubular body which is gradually bent up to annular form as the rings are moved into place. After the rings have been inserted in the core, the ends of the core are pushed back away from the ends of the bead rings which are then butt welded or otherwise secured together to form endless rings, after which the ends of the tubular body are brought together and joined to form an endless band by connecting the adjacent ends of the steel cable or wire and splicing the ends of the rubber strips adhered to the wire coils. After the endless band is thus formed it is compressed into or upon a covering sheet of rubber in a suitable annular press which longitudinally flattens the tubular body, forces the cross wires into side by side position throughout the circumference of the band and firmly unites the wire to an enveloping body of rubber. Tread stock may then be applied to the band and the casing thus formed can be molded to final form in a vulcanizing mold. If it is desired to have a plurality of reinforcing bands and a plurality of beads, a second band may be formed, preferably of slightly less diameter than the first, and this band may be telescoped within the outer band, after which the telescoped bands may be placed in the vulcanizing mold, where the tire casing is brought into final form and vulcanized.

In building a tire by the method of the present invention, the reinforcing wire A, preferably of stranded steel cable, is wound helically in closely spaced convolutions upon a flat core B. The core B comprises two parallel side sections 1 that are attached to opposite ends of a supporting lever 2 so that they can be moved simultaneously in opposite directions from the position shown in Fig. 1 to collapse the core, the sections 1 being maintained in parallel relation by means of a suitable parallel linkage (not shown) connected to the lever 2 through a link 3. A wedge-shaped central core section 4 fits in grooves formed in the inner edges of the sections 1, the section 4 being tapered longitudinally so that it can be adjusted to fit tightly between the sections 1.

As shown in Fig. 2, the side sections 1 have upper bevels 7 and lower bevels 8 at their outer edges, the bevels 8 being slightly longer than the bevels 7 so that the portions of the wire extending across the under side of the core are slightly longer than the strands extending across the top, the longer strands forming the outside of the completed band and being of such length that the outer and inner runs of cable will interfit and lie side by side in the finished band. The outer edge portions of the sections 1 are slightly thicker than the body thereof, providing shoulders 9 which space the wire A slightly away from the body portions of the core sections.

At their outer edges the sections 1 are provided with longitudinal grooves to receive circumferentially grooved rods 10 which are rigidly secured to the sections and which have grooves properly spaced to receive the successive coils of wire. The wire is fed to the coil from a suitable reel 11 and the core is mounted to rotate about a central axis, the outer end of the center section 4 being provided with a trunnion 12 which is journaled in a suitable fixed bearing 13, suitable means (not shown) being provided to support and rotate the opposite ends of the core. The outer ends of the sections 1 of the core are connected by a cross link 14 which is connected to one section by means of a pivot pin 15 and which has a hook 16 at its opposite end which engages a pin 17 carried by the other core section.

With the core sections positioned as shown in Fig. 1 of the drawings, the wire is wound in closely spaced convolutions on the core for sufficient length to provide the desired circumference of the band. After completion of the winding operation, the wires are clamped at the edges of the core by means of longitudinal bars 18 which are connected to the pins 15 and 17 by means of hooks 19, and held at their opposite ends by means of pivoted yokes 20. In order to enable the bars 18 to exert pressure on the wires throughout the length thereof, these bars are preferably provided with a wire engaging edge that has very slight longitudinal convexity so that the bars are sprung slightly when secured in clamping position by the yokes 20.

After the clamping bars 18 are applied, the center section of the core is removed, and the lever 2 is swung to move the side sections 1 of the core longitudinally in opposite directions to dispose the convolutions of the wire A diagonally as shown in Fig. 3 of the drawings. After the core sections have been collapsed, a narrow spacer 21 may be inserted between the side sections 1 of the core to hold the sections against relative movements.

Prior to the winding operation wide rubber strips 22 are adhered to the upper faces of the sections 1, the strips 22 extending from the shoulders 9 to the inner edges of the sections 1. On the under side of the core, narrow strips 24 of rubber are adhered to the lower faces of the side sections 1. The spacer strip 21 may have a strip of sheet rubber 23 attached to its upper face so that a substantially continuous sheet of rubber is provided on one side of the core. The winding of steel wire is slightly spaced from the surface of these sheets and strips of rubber to avoid substantial contact between the windings and the rubber when the convolutions are made diagonal. With the core held in the position shown in Fig. 3, the wires extending across the top and bottom of the core are pressed against and adhered to the rubber strips 22 and 23 and against the narrow rubber strips 24 so that the spacing of the wire strands will be maintained after removal of the wire coil from the core.

Figure 11:
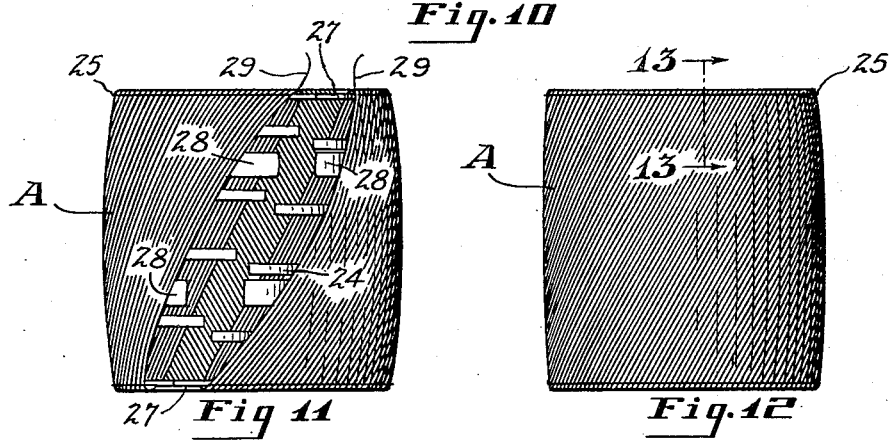
Fig. 11 shows both bead rings inserted within the tubular body and positioned for welding their ends together.

In order to maintain uniform spacing and positioning of the loops of the cable at the edge portions of the coil, a spacer wire 25 is soldered along each edge of the coil and the solder is applied to the strands of the cabled wire in the portions thereof engaging the round rods 10 to stiffen the rounded edge portions of the coil and render them nonresilient so that they will hold their form after removal from the core. After removal from the core, the flat tubular body formed by the cabled wire A and strips of rubber applied to the interior thereof are laid upon a suitable work table and a split steel bead ring 27 is inserted into one end of the tubular body and worked through the body, which is gradually bent along one edge thereof to the form of the ring as the ring is passed or threaded through the body. After the ring is threaded through the tubular body, a second ring 27 is applied in the same manner. The end portions of the tubular body are then pushed back away from the ends of the rings 27 and the opposed ends of the respective rings 27 are brought together and butt welded, as indicated in Fig. 11 of the drawings, to form two endless bead rings. Prior to the insertion of the rings, rubber filler strips 28 may be inserted into the tubular body and after the bead rings are welded the ends of the tubular body may be drawn together and the ends of the strips 22 and 24 and 28 may be spliced and projecting ends 29 of the wire A may be joined together to form a substantially cylindrical body such as shown in Fig. 12.

Figure 12:
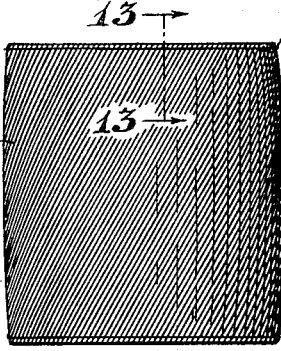
Fig. 12 shows the completed band after the ends of the rubber covered coil have been secured together.
Figure 13:
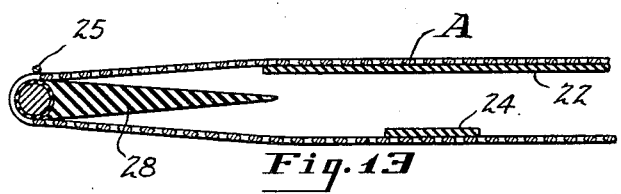
Fig. 13 is a fragmentary sectional view on an enlarged scale taken on the line indicated at 13—13 in Fig. 12.

The cylindrical body shown in Fig. 12 is then compressed to adhere both the upper and lower strands of reinforcing wire to the rubber sheet 22. This compressing operation is performed on a drum 30 which is provided with a peripheral channel to receive an air bag 31 which has a transversely flat, substantially cylindrical outer wall which has a stem 32 by means of which fluid under pressure may be introduced into the bag to inflate it.

The hollow band shown in Fig. 12 is compressed between the air bag 31 and an outer cylindrical drum 33 within which the band is mounted. To permit more easy removal of the band from within the drum 33, a segmental steel band 34 is mounted upon the exterior of the band with its opposite edges overlying the bead rings 27, after which the tire band enclosed by the band 34 is slipped into the cylinder 33 which is provided with detachable retaining rings 35 at its ends which engage the band 34 and the bead portions of the tire band to hold the same in position.

A layer of unvulcanized rubber 36 may be applied to the exterior of the air bag 31 before the insertion of the air bag into the drum 33 so that prior to the application of pressure the wires A and rubber sheets 22 and 36 are disposed substantially as shown in Fig. 15.

Prior to the insertion of the tire band within the drum 33, filler strips 37 are applied to the exterior of the band at the beaded edges. After application of pressure the wires A are forced together and embedded in the rubber body formed by the rubber sheets 22 and 36, substantially as shown in Figs. 16 and 17 of the drawings. This completes the assembly of the inside band as shown in Fig. 16 and in assembled relation with the outer band in Fig. 20.

The outer band is made the same as the inside band except that the beads 27 preferably are of somewhat larger diameter and the external bead construction preferably is different.

In making the outside band, a bead filler 39 of suitable rubber stock is assembled with the band and held in place by a strip of rubberized bias cut cross woven fabric 40 that extends around the inner and outer surfaces of the bead assembly and along the edge portions of the reinforcing band. The band as thus assembled is mounted on the core 30 and air bag 31 and subjected to pressure against the cylindrical drum 33 in the manner described for the inside band. The cylindrical drum 33 is then removed and suitable tread stock 42 is applied to the outer face of the band. After the application of the tread stock 42 to the tire band, split or segmental center and side ring sections 43 and 44 are applied to the exterior of the band, as shown in Fig. 18 and the assembly of the band with the ring sections 43 and 44 on the drum 30 is inserted within an external cylinder 45 so that the tire band assembly may be compressed by fluid pressure introduced into the air bag 31.

Figure 21:
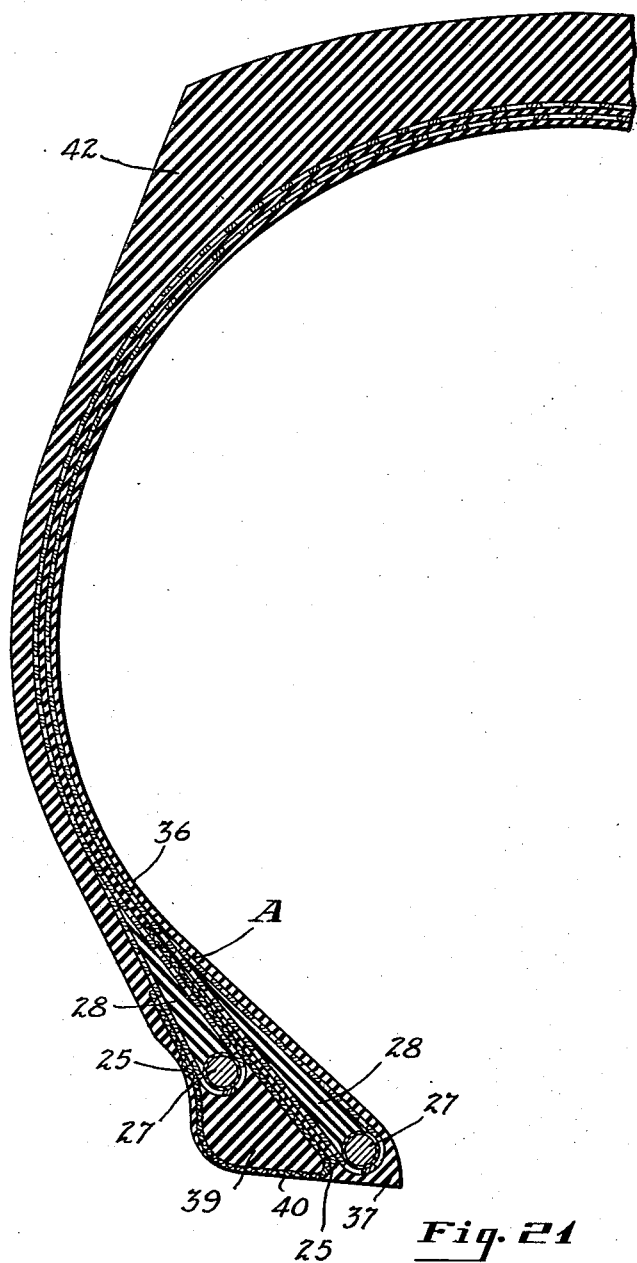
Fig. 21 is a fragmentary transverse section showing the completed tire which is formed by placing the telescoped bands shown in Figs. 19 and 20 within a vulcanizing mold and integrally uniting them by heat and pressure.

A plurality of superposed wire reinforced bands of opposite angularities may be employed in a tire, in which case the completed outer band 41 to which the tread stock 42 is applied, has a completed inner tire band 46 of slightly less diameter than the outer band telescoped within the outer band, as shown in Figs. 19 and 20. The relative diameters of the outer and inner bands are exaggerated somewhat in Figs. 20 and 21 for better illustrating their relation in this stage of manufacture. The assembled bands may then be expanded and placed within a conventional tire vulcanizing mold where the bands are expanded in the usual manner against the interior of the mold to form a tire casing such as shown in Fig. 21 of the drawings.

The inner face of the outer band or the outer face of the inner band, or both, have cotton flock applied to them before assembly over a layer of rubber cement to permit these surfaces to move relative to each other during the forming operation without detracting from the vulcanized union thereof during vulcanization. Any other surfacing material giving similar results may be used.

It is to be understood that variations and modifications of the specific methods and structures herein shown and described for purposes of illustration, may be made without departing from the invention.

What I claim is:

1. The herein described method of making a ply band for use in building pneumatic tire casings which comprises forming a transversely flat helically wound wire coil, shifting one edge of said coil longitudinally with respect to the other to dispose the convolutions diagonally, applying strips of unvulcanized rubber to the interior of the coil intermediate the side edges, soldering longitudinally extending wires to each convolution at each edge of the coil, inserting split bead rings and rubber filler strips in the coil, welding the ends of each bead ring, splicing the ends of the rubber strips and attaching the ends of the wire together, applying a layer of rubber to the band so formed, and compressing the band to embed the convolutions of the wire in the rubber.

2. The herein described method of making a ply band for use in building pneumatic tire casings which comprises forming a transversely flat helically wound wire coil, shifting one edge of said coil longitudinally with respect to the other to dispose the convolutions diagonally, applying strips of unvulcanized rubber to the interior of the coil intermediate the side edges, soldering longitudinally extending wires to each convolution at each edge of the coil, inserting split bead rings and rubber filler strips in the coil, welding the ends of each bead ring, splicing the ends of the rubber strips and attaching the ends of the wire together, applying a layer of rubber to the band so formed, and applying radial pressure to the band simultaneously throughout its circumference to dispose the diagonally extending strands of wire side by side and to embed them in the rubber.

3. The herein described method of making a ply band for use in building pneumatic tire casings which comprises forming a transversely flat helically wound wire coil, shifting one edge of said coil longitudinally with respect to the other to dispose the convolutions diagonally, applying strips of unvulcanized rubber to the interior of the coil intermediate the side edges, soldering longitudinally extending wires to each convolution at each edge of the coil, inserting split bead rings and rubber filler strips in the coil, welding the ends of each bead ring, splicing the ends of the rubber strips and attaching the ends of the wire together, applying a layer of rubber to the band so formed, compressing the band to embed the convolutions of the wire in the rubber, applying tread stock to said band, and then expanding the band under pressure in a tire mold and vulcanizing the same.

4. The herein described method of making a ply band for use in building pneumatic tire casings which comprises forming a transversely flat helically wound coil of metal cable, applying strips of unvulcanized rubber to the interior of the coil intermediate the side edges thereof, applying solder to the end portions of the coil to stiffen the same, inserting split circular bead rings in the stiffened edge portions of the coil, welding the ends of said rings together, drawing the end portions of said coil together on said rings and fastening the ends of the wire forming the coil together, splicing the ends of the rubber strips, applying a layer of rubber to the band and compressing the body of the band to flatten the same and embed the wire in rubber.

5. The herein described method of making multiple bead tires which comprises forming a plurality of endless carcass bands varying slightly in diameter and each having bead rings enclosed in edge portions thereof, applying tread rubber stock to the larger of the bands, telescoping the bands to dispose one within another and expanding said telescoped bands under pressure in a tire mold and vulcanizing the same.

WILLIAM C. McCOY.

REFERENCES CITED

The following references are of record in the file of this patent:

UNITED STATES PATENTS

| Number | Name | Date |
| --- | --- | --- |
| 1,366,220 | Swinehart | Jan. 18, 1921 |
| 1,732,759 | Maas et al. | Oct. 22, 1929 |
| 1,792,776 | Snyder | Feb. 17, 1931 |